United States Patent
Coura et al.

(10) Patent No.: US 7,032,878 B2
(45) Date of Patent: Apr. 25, 2006

(54) METHOD AND DEVICE FOR CONTROLLING THE SWITCHING MOVEMENT OF A VALVE

(75) Inventors: Herbert Coura, Büchen (DE); Martin Gesikiewicz, Lübeck (DE); Bernd Porath, Breitenfelde (DE)

(73) Assignee: Tuchenhagen GmbH, Buchen (DE)

( * ) Notice: Subject to any disclaimer, the term of this patent is extended or adjusted under 35 U.S.C. 154(b) by 0 days.

(21) Appl. No.: 10/477,286

(22) PCT Filed: May 10, 2002

(86) PCT No.: PCT/EP02/05135

§ 371 (c)(1),
(2), (4) Date: Jun. 9, 2004

(87) PCT Pub. No.: WO02/093058

PCT Pub. Date: Nov. 21, 2002

(65) Prior Publication Data

US 2004/0211928 A1    Oct. 28, 2004

(30) Foreign Application Priority Data

May 12, 2001 (DE) ................................ 101 23 243

(51) Int. Cl.
*F16K 31/02* (2006.01)
(52) U.S. Cl. ................. 251/129.04; 137/554; 137/556; 137/614.18; 251/284
(58) Field of Classification Search ........... 251/56, 251/129.04, 284; 137/240, 554, 556, 614.16, 137/614.18, 614.19
See application file for complete search history.

(56) References Cited

U.S. PATENT DOCUMENTS

| 4,344,453 | A | * | 8/1982 | Tuchenhagen et al. ..... 137/240 |
| 5,704,586 | A | | 1/1998 | Nielsen .................. 251/129.04 |
| 5,771,926 | A | * | 6/1998 | Medal et al. ................ 137/554 |
| 6,360,773 | B1 | * | 3/2002 | Rhodes ....................... 137/554 |

FOREIGN PATENT DOCUMENTS

| GB | 2 194 648 A | 3/1988 |
| WO | 90/15948 A1 | 12/1990 |
| WO | 96/10731 A1 | 4/1996 |

OTHER PUBLICATIONS

Journal dei Jan.-Feb. 2001, p. 14.
Journal Cit/plus/Apr. 2001, pp. 42 through 46.
Journal Brauwelt No. 46/47 (2000), pp. 2018 through 2023.

* cited by examiner

*Primary Examiner*—Justine R. Yu
*Assistant Examiner*—Peter deVore
(74) *Attorney, Agent, or Firm*—Vidas, Arrett & Steinkraus, P.A.

(57) ABSTRACT

A method for the control of the switching operation of a valve by the fact that the two end positions and the intermediate position(s) of the valve are clearly determined each by the valve rod(s) bearing directly or indirectly on fixed position limiters, the fixed position limiters each are moved to in the course of the first switching operations of the valve, and the respective fixed position messages resulting therefrom are stored.

17 Claims, 6 Drawing Sheets

METHOD AND DEVICE FOR CONTROLLING THE SWITCHING MOVEMENT OF A VALVE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

A known valve control of this type allows to detect the position of valve disks, e.g. at an accuracy of 0.1 mm (Journal dei 1-2/2001, page 14). Such accuracy presupposes a sensor system which makes possible four different positions of detection.

U.S. Pat. No. 5,704,586 describes a device for the control of a valve in which a rectilinearly operating position indicator detects the respective position of the valve rod and transmits it to a data registration device. The latter is in communication with a control unit which, in turn, has an access to a solenoid valve which engages a supply line for compressed air to the driving cylinder of the valve. The valve rod is connected to the closing member of the associated valve so that the position of the valve can be detected. This known device monitors the valve operation between a number of fixed valve positions. To this end, means are provided to store these desired valve positions in a data memory. In addition, the device has checking devices to compare the current position indications of the position indicator to the fixed switching positions of the valve which are deposited in said data memory. Furthermore, the control has programs in which the alterations of the position indications are deposited for the fixed valve positions during the repeated valve switching operations with the programs balancing out those alterations which are within a tolerance range of the deposited position indicator. Such an assembly has the advantage that the position indicator can adjust itself within the predetermined tolerance range so that influences exerted on the stroke of the valve can be detected and compensated (a so-called self-adjustment), for example, because of a change of temperature, wear to the sealing or change to the direction of afflux to the closing member, which can lead to an altered closing position of the valve disk, for example.

In the conventional technique, for example, the closed and opened positions of the valve are detected by an associated stationary position detector each. Now, for example, when the closed position of the valve disk changes and, hence, so does the information associated with the original closed position because of the aforementioned influences the stationarily arranged position detector cannot identify such an alteration. For example, when the position detector is a so-called microswitch which corresponds with an annular groove within the valve rod the groove releasing this microswitch will give a release signal in the original closed position although the valve is not completely closed yet because of wear to the sealing.

The fundamental solution embodied in U.S. Pat. No. 5,704,586 for a valve control, in the course of the so-called self-adjustment at certain time intervals, now allows to move the closing member and, thus, the valve rod connected thereto into the closed position which is actually possible and has perhaps been altered by the aforementioned influencing factors, and the system for the position detection is readjusted, if necessary, to the altered closing conditions which now exist.

A sensor system which functions with a non-contactingly working position indicator, on one hand, and can adapt itself to varying operating conditions of the valve within predefined tolerance ranges, on the other, is referred to as a so-called "floating measuring system" in relevant technical journals (confer Journal CIT/plus/4/01, pages 42 to 46; Journal dei 1-2/2001, page 14; Journal Brauwelt No. 46/47 (2000), pages 2018 to 2023).

The valve control described in the aforementioned reference documents makes possible four different detection positions of the valve (fixed valve positions) which are mentioned there. Apart from the two detection positions for the closed and opened positions of the valve, it also allows to identify those positions in which the valve seat is opened by a gap via the one or other valve disk for the purpose of the so-called seat cleaning if the valve to be controlled is a so-called double-seated valve which has two closing members movable relative to each other, i.e. a valve disk which is independently driven and a so-called double disk that is desmodromically driven by it and, hence, is dependently driven.

The realization of a so-called floating measuring system presupposes that there is a position indicator which works in a reliably non-contacting, preferably rectilinear way. A device of this type is known from WO 96/10731, for example. The device which is referred to as a position detection device there serves for determining a position of an element, this element being a valve tappet having a longitudinal axis, by analogy with a valve control of the previously mentioned type, and the tappet being movable along its longitudinal axis. As the cited document sets forth a magnet is mounted on the element. Moreover, an array of several magnetic-field converters is provided which are disposed in a rectilinear relationship in parallel with and in the vicinity of the path length defined by the valve tappet with each of these field converters, which preferably are magnetoresistive, predetermining a bipolar output signal when the magnet approaches the field converter, runs past it, and moves away from each one. The array of field converters predetermines a multiplicity of output signal values for a position of the magnet which are resorted to for a determination of this position and, thus, the valve rod to which the valve tappet is attached. The magnetic-field converters concerned, for example, are Hall sensors which when the magnetic field changes produce a voltage variation proportional to such change. The position detection device described in the document WO 96/10731 makes it possible to generate an electric output signal proportional to the valve tappet movement which can be evaluated in a valve control for position identification in accordance with U.S. Pat. No. 5,704,586.

In the device for the control of the valve operation between a number of fixed valve positions according to U.S. Pat. No. 5,704,586, the current position messages of the position detector are compared to the fixed position messages which are deposited in the data memory. Any changes that could possibly occur here are calculated and are compensated as far as they are within a predetermined tolerance range around a deposited fixed position message. This means that the field of tolerance which has been predetermined will be shifted to a predefined, limited extent in response to the change found to exist. In conjunction with this compensation, it cannot be made out distinctly whether the alterations found to exist were provoked by real shifts of the fixed valve setting (end positions, intermediate positions) which have occurred in the meantime or whether those completely or partially are changes in the electronic measuring system. Therefore, it is absolutely possible that although changes are determined for the actual fixed valve positions those changes are not initially brought about by the closing member position with regard to the associated seating surface. Accordingly, it is imaginable that a compensation is made even if there are no sufficient relevant reasons justified by the real conditions on the valve.

BRIEF SUMMARY OF THE INVENTION

Proceeding from the fundamental solution for a valve control according to U.S. Pat. No. 5,704,586, on one hand, and for a position determination according to WO 96/10731, on the other, it is the object of the present invention to provide a method for the control of the switching operation of a valve that simplifies the device for its implementation over known devices, achieves advantages in handling, and makes it more reliable to identify defined, fixed valve positions.

Advantageous aspects of the proposed method are the subject matter of the sub-claims. A device for the implementation of the method is characterized by the features of claim 9. Advantageous aspects of the proposed method are the subject matter of the subordinate dependent claims.

The crucial approach to increase reliability in identifying the defined, fixed valve positions lies in that these positions are clearly determined by the valve rod or valve roads bearing directly or indirectly on fixed position limiters. According to an advantageous aspects of the device, such fixed position limiters are formed as metallic stops. This means that the independently driven closing member, the valve disk, finds a metallic bearing point on the associated position limiter (metallic stop) in both the closed position of the valve and the other fixed valve positions marked. For example, this is not the case for devices according to the state of the art, because at least the end position limiter of the valve disk, when in the closed position, is determined here by the more or less ductile seat sealing, which is arranged in the valve disk and rests on the associated seating surface. As a result, any wear occurring to the seal and ageing processes will inevitably alter the closed position of the valve disk and, when controls exist according to the state of the art, require self-adjustment at least in this identification position.

The set-up of the control in the course of the first switching operations of the valve is made easier by the fixed position limiters because they are run to respectively and the respective fixed position messages which result therefrom are stored each. The control is notified of the outfit of the valve in advance during such so-called set-up. The fixed valve positions possible result from this outfit. This means that a valve of any possible outfit, accordingly, sets up by itself automatically while withdrawing the parameters required therefor from the respective data memory of the control and setting them. At this stage, the individual manufacturing tolerances of the various components of which a valve is usually composed are substantially without significance as the respective fixed position message is tapped from the actually resulting end or intermediate positions and forms a basis of the set-up. In the course of the set-up, the fixed position messages are assigned a predetermined tolerance range each so that the two limiting values of this respective tolerance range can be calculated from the fixed position messages in conjunction with the tolerance range concerned.

In this connection, a further proposal is made that ranges of tolerance $\Delta T_{1i}$, $\Delta T_{2i}$, $\Delta T_{3i}$, $\Delta T_{4i}$ of different quality levels i=1, 2, 3, . . . should be contained in the data record which is deposited in the control and which characterizes and monitors the respective configuration of the valve, its switching operations, and its switching algorithm, each quality level i comprising a tolerance range set $\Delta T_{11}$, $\Delta T_{21}$, $\Delta T_{31}$, $\Delta T_{41}$; $\Delta T_{12}$, $\Delta T_{22}$, $\Delta T_{32}$, $\Delta T_{42}$; $\Delta T_{13}$, $\Delta T_{23}$, . . . ; $\Delta T_{14}$, $\Delta T_{24}$, . . . The quality levels i which are provided take account of the various valve types and their operational and working conditions. The quality level i is selected before the valve performs a switching operation for the first time and in advance of the set-up to be made.

In contrast with the aforementioned control according to the state of the art, the proposed method dispenses with compensating alterations found to have occurred to the fixed valve positions. It is merely during the subsequent switching operations of the valve that an actual fixed position message $y_1^*$, $y_2^*$, $y_3^*$, $y_4^*$ associated with each actual end positions and/or actual intermediate positions is resorted to and is compared to the two limiting values $y_{1o}$, $y_{1u}$, $y_{2o}$, $y_{2u}$, . . . of the tolerance range $\Delta T_{1i}$, $\Delta T_{2i}$, . . . in question. The calculation of the limiting values and the comparison of these limiting values to the actual fixed position messages allow to deduce in an easy manner whether the actual fixed valve position is within or outside the predetermined tolance range. In this conjunction, another proposal is made that if the actual fixed position messages $y_1^*$ to $y_4^*$ are nearing the associated limiting values $y_{1o}$, $y_{1u}$, $y_{2o}$, $y_{2u}$, . . . and/or are leaving the associated tolerance range $\Delta T_{1i}$, $\Delta T_{2i}$, . . . a switching signal and/or message signal should be generated.

According to another proposal, an aspect of the method provides that the fixed position messages $y_1^*$, $y_2^*$, $y_3^*$, $y_4^*$ should be associated with a group of tolerance ranges. This means that each of these fixed position messages is combined with a tolerance range of the same quality level i. In this conjunction, a further proposal provides that each of the fixed position messages is associated with tolerance ranges of different quality levels. What follows therefrom, for example, is that the closing position of the valve has associated therewith a more narrow-sized tolerance range than has associated therewith the less critical opened position of the valve.

When it can be assessed in which direction alterations to the fixed position messages are most likely to occur another aspect of the proposed method can be advantageously used that provides that the tolerance range $\Delta T_{1i}$, $\Delta T_{2i}$, $\Delta T_{3i}$, $\Delta T_{4i}$ is arranged in asymmetry with and in favour of the most likely alteration of the associated fixed position message $y_1$, $y_2$, $y_3$, $y_4$ to the latter. In a mathematical manner of writing, this means that the respective limiting values of the proposed tolerance range are calculated as follows: $y_{1o}=y_1+\phi\Delta T_{1i}$, $y_{1u}=y_1-[1-\phi]\Delta T_{1i}$ where the fraction factor $\phi$ may assume a value between 0 and 1.

In addition, a proposal is made that the method should be configured to the effect that the tolerance range $\Delta T_{1i}$, $\Delta T_{2i}$, $\Delta T_{3i}$, $\Delta T_{4i}$ is arranged in symmetry with the associated fixed position message $y_1$, $y_2$, $y_3$, $y_4$. As a result, the upper limiting value $y_{1o}$ and the lower limiting value $y_{1u}$ are at equal distances from the fixed position message $y_1$; the fraction factor is $\phi=0.5$. This equally applies also to the other fixed position messages $y_2$ to $y_4$ ($y_{1o}=y_1+\Delta T_{1i}/2$; $y_{1u}=y_1-\Delta T_{1i}/2$; . . . ).

To clearly define the approximation of the actual fixed position messages $y_1^*$ to $y_4^*$ to the associated limiting values of the tolerance range, which makes advisable a maintenance of the valve, a proposal is made, according to a further aspect of the invention, that an approximation is present when the actual fixed position message $y_1^*$ to $y_4^*$ enters an approximation tolerance $\Delta_{tw}$ which joins the two other limiting values each within the respective tolerance range.

The device proposed for the implementation of the method distinguishes itself by the fixed position limiters A1 to A4 mentioned in the technical process already which are advantageously formed as metallic stops, on one hand, and a position detector operating as a non-contactingly working position indicator device and by a control button which is disposed at the side of the valve drive facing away from the valve and which accommodates all means necessary for the control of the valve, on the other.

An advantageous embodiment provides for a sensor unit formed as an electronic sub-assembly in the position detector in which a number of stationary magnetoresistive field converters are arranged in a series array in parallel with and in the vicinity of a valve rod movement to be detected, a magnet connected to the valve rod being displaceable along the field converters. A sensor unit of this type has been known from WO 96/10731. Apart from having the sensor unit which is formed as an objectively existing unit, the position sensor comprises another objectively existing unit, the so-called communication unit. The sensor and communication units are interconnected via two interfaces. In addition, the sensor unit has plug-in connections for the pilot valves. The communication unit is plugged into the sensor unit and contains a microprocessor, a data memory, an internal control and display panel, a signal adapter as well as the complete electronic equipment and software required for communication with a stored-program control, indicator lamps, and a block of screw terminals. The sensor unit is the same for all valve types which can be equipped with an inventive control head with the communication unit determining whether the position detector altogether is compatible to alternating current, direct current or buses.

The proposed device proves to be of a simple configuration if as another proposal suggests the control head has provided therein an installation block which receives the entire distribution system for the pressure medium in itself and carries the pilot valves for the control of the pressure medium and the position detector comprising the sensor and communication units.

In this conjunction, another embodiment provides that the installation block is designed for the highest completion stage (maximum outfit) of the control of a valve and, thus, for a valve having all optionally possible outfit versions. This means that all of the ducts for the supply and respective discharge of pressure medium (control air) and further communication ducts are disposed in this installation block.

For an electric and/or electronic realization of the different outfit versions of the control of the valve, namely from the simplest valve having a closed position and an opened position, which require to be detected as to their positions, via a double-seated valve with seat cleaning on each of the two closing members, possibly in connection with a repeating opening and closing operation in the course of seat cleaning, up to the additional load applied to the driving piston for the full stroke, a proposal is made that the electric and electronic circuit configuration should be appropriately set up by modules and that the individual completion stages of the circuit configuration should be realized by plugging on appropriate modular components. For this purpose, the installation block is equipped for a connection of three pilot valves so that, apart from triggering the full stroke by a first pilot valve, two more pilot valves can be arranged to realize the two intermediate positions (the first and second lifting strokes). To this end, the control is configured in such a way that different supply voltages (direct-current or alternating-current voltages of different levels) may be led to the control with these respective circumstances not causing an exchange of the pilot valve or pilot valves. The conversion of voltage and its adaptation to the voltage determined by the pilot valve used are advantageously accomplished by itself.

According to a further proposal, the pressure medium which triggers the valve drive for the generation of the full stroke is fed to the valve drive from outside via a first pressure medium connection.

The aforementioned external, first pressure medium connection may be omitted when the pressure medium is led through a valve rod bore in the valve rod as is envisaged by a further proposal. This valve rod bore opens out at the end of the valve rod, where also the magnet of the position detector is arranged, into a chamber casing closed towards the environment to which a pressure medium is applied to effect the valve drive. Such an assembly results in a simplification of the device because the external pressure medium connection on the control head and the flexible tube which is usually installed outside the drive from the control head to the driving cylinder and is for the supply of pressure medium are no longer necessary.

Another aspect of the proposed device provides that the position detector is equipped with more than one indicator lamp of different colorations, the indicator lamps being visible all around (through 360°) via a stray light lens which is disposed in the closed front-end face of a covering hood locking the control head so that the respective function of the valve can be perceived from all sides. The indicator lamps are used to signal the different switching conditions (closed position, opened position, seat cleaning position), error messages, need for maintenance, valve trouble or set-up functions. These indicator lamps, preferably three indicator lamps the colors of which are green, yellow, red and are lit continuously or flashingly are arranged on the head of the communication unit.

In addition, a further proposal provides that the valve drive has a fourth pressure medium connection via which, when the valve is in the closing position, the closing force acting on the valve rod is increased by the supply of pressure medium. This fourth pressure medium connection is triggered via a so-called NON member which is arranged on the installation block and which, in case of need when the driving piston for the full stroke is not triggered, allows to optionally pass a pressure medium onto the rearward side of the driving piston for the full stroke in support of the elastic force acting there.

BRIEF DESCRIPTION OF THE DRAWINGS

An embodiment of the invention by which the proposed method for the control of the switching operation of a valve is explained is illustrated in the drawing and will be described below with regard to its structure and function. In the drawings.

LIST OF REFERENCE NUMBERS USED AS ABBREVIATIONS

1 Control head
1a Casing bottom portion
2 Installation block
2a Chamber casing
2b Mounting element
3, 101a Valve rod
3a Longitudinal axis
3b Valve rod bore
4 Magnet
5 Position detector
5.1 Sensor unit
5.1a Magnetic-field converters (Hall sensors)
5.1b Mounting groove
5.2 Communication unit
6 Multiplexer
7 A/D converter
8 Microprocessor
8a Data memory
8b Internal control and display panel.
8c Signal adapter
8d First interface
8e Second interface
8f Terminal strip
8g Connection for a parametrization device
8h Connection for pilot valves
9 First pilot valve (Main drive)
9.1 First connection
10 Second pilot valve (First lifting drive)
10.1 Second connection
11 Third pilot valve (Second lifting drive)
11.1 Third connection
12 Lamp indicator
13.1 First set of pressure medium connections
13.2 Second set of pressure medium connections
14.1 First connection for control and signal processing lines
14.2 Second connection for control and signal processing lines
15 NON element (additional force, closing: Main drive)
15.1 Fourth connection
16 Supply duct system
16* Second supply duct system
16a First supply duct portion
16b Second supply duct portion
16c Third supply duct portion
16.11 Supply connection
16.12 Supply duct connection point
17 First pressure medium duct system
17a First pressure medium duct portion
17b Second pressure medium duct portion
17c Third pressure medium duct portion
17d Fourth pressure medium duct portion
17.11 First pressure medium connection point
17.12 First pressure medium connection
17.21 Second pressure medium connection point
17.22 Second pressure medium connection
17.31 Third pressure medium connection point
17.32 Third pressure medium connection
18 Discharge duct system
18a First discharge duct portion
18b Second discharge duct portion
18c Third discharge duct portion
18.11 Discharge duct connection point
18.12 Discharge duct connection
19 Second pressure medium duct system
19.11 Fourth pressure medium connection point
19.12 Fourth pressure medium connection
20 Non-return valve connection
21 Covering hood
21a Stray light lens
22 Connection element
100 Valve
100a First valve casing
100b Second valve casing
101 Valve disk
101a, 3 Valve rod
101b First driving carrier
102 Double disk
102a Hollow rod
102b Second driving carrier
103 First seating surface
104 Second seating surface
105 Valve drive
105a Main piston (Main drive)
105b First lifting piston (First lifting drive)
105c Second lifting piston (Second lifting drive)
106a First pressure medium connection
106b Second pressure medium connection
106c Third pressure medium connection
106d Fourth pressure medium connection
107 First seat seal
108 Second seat seal
A Pressure medium discharge
A1 First position limiter (First metallic stop)
A2 Second position limiter (Second metallic stop)
A3 Third position limiter (Third metallic stop)
A4 Fourth position limiter (Fourth metallic stop)
B Reference system
D Pressure medium
DS Data record
H Full stroke
N Magnetic north pole
S Magnetic south pole
SL1 Control air for first lifting stroke
SL2 Control air for second lifting stroke
SV Pressure medium for full stroke (external)
SZ Pressure medium for additional load
Z Pressure medium supply
$\Delta T_{1i}$ Tolerance range for associated fixed position message $y_1$
$\Delta T_{2i}$ Tolerance range for associated fixed position message $y_2$
$\Delta T_{3i}$ Tolerance range for associated fixed position message $y_3$ $\Delta T_{4i}$ Tolerance range for associated fixed position message $y_3$
i Quality levels
$\Delta t_w$ Approximation tolerance
y Position message
$y_1$ First fixed position message (First end position: closed position)
$y_2$ Second fixed position message (Second end position: opened position)
$y_3$ Third fixed position message (Intermediate position of valve disk: first lifting stroke)
$y_4$ Fourth fixed position message (Intermediate position of valve disk: second lifting stroke)
$y_1^*$ First actual fixed position message
$y_2^*$ Second actual fixed position message
$y_3^*$ Third actual fixed position message
$y_4^*$ Fourth actual fixed position message
$y1^{*W}$ to ... $y4^{*W}$ Maintenance message for $y_1^*$ to $y_4^*$
$y1^{*S}$ to ... $y4^{*S}$ Trouble message for $y_1^*$ to $y_4^*$
$y_{1o}, y_{1u}$ Limiting values of tolerance range $\Delta T_{1i}$
$y_{2o}, y_{2u}$ Limiting values of tolerance range $\Delta T_{2i}$
$y_{3o}, y_{3u}$ Limiting values of tolerance range $\Delta T_{3i}$
$y_{4o}, y_{4u}$ Limiting values of tolerance range $\Delta T_{4i}$
φ Fraction factor

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The valve disk 101 is transferred to a partially opened position via a first lifting piston 105b in the valve drive 105 for the purpose of cleaning its seat. This partially opened position or intermediate position furnishes the third fixed position message $y_3$. The clear end position limitation for this intermediate position is found by the first lifting piston 105b on a third fixed position limiter A3, the valve road 101a being carried along by the first lifting piston 105b via a first driving carrier 101b formed on the valve rod 101a (the third metallic stop). A second pressure medium connection 106b serves for applying a pressure medium to the first lifting piston 105b.

A second lifting piston 105c, which engages the hollow rod 102a via a second driving carrier 102b, allows the double disk 102 to be transferred to a partially opened position in which its seat can be cleaned. To this end, a pressure medium D is applied to the second lifting piston 105c via a third pressure medium connection 106c. This intermediate position, which furnishes the fourth fixed position message $y_4$, is confined by the fourth position limiter A4 (the fourth metallic stop).

The possible switching operations described above for the double-seated valve constitute the maximum motion spectrum possible which the inventive control has to accomplish. In addition, a provision is also made that the valve disk 101, when in a non-triggered condition, should be pressed onto its seating surface 103 by means of an additional force. To this end, the pressure medium D is applied to the main piston 105a on its rearward side via a fourth pressure medium connection 106d.

A first pilot valve 9, a second pilot valve 10, and a third pilot valve 11 are provided for the supply to the pressure medium connections 106a to 106c. The fourth pressure medium connection 106d is triggered by a so-called NON element which undergoes triggering in case of need and every time there is no triggering of the main piston 105a via the first pressure medium connection 106a. The inventive control is schematically shown in the upper portion of FIG. 1 and its mission, amongst others, is to trigger the aforementioned pilot valves 9, 10, and 11 in order that the above described switching operations of the double-seated valve become practicable. Z signifies the supply of the pressure medium and A denotes the discharge of the pressure medium.

Figure 1:
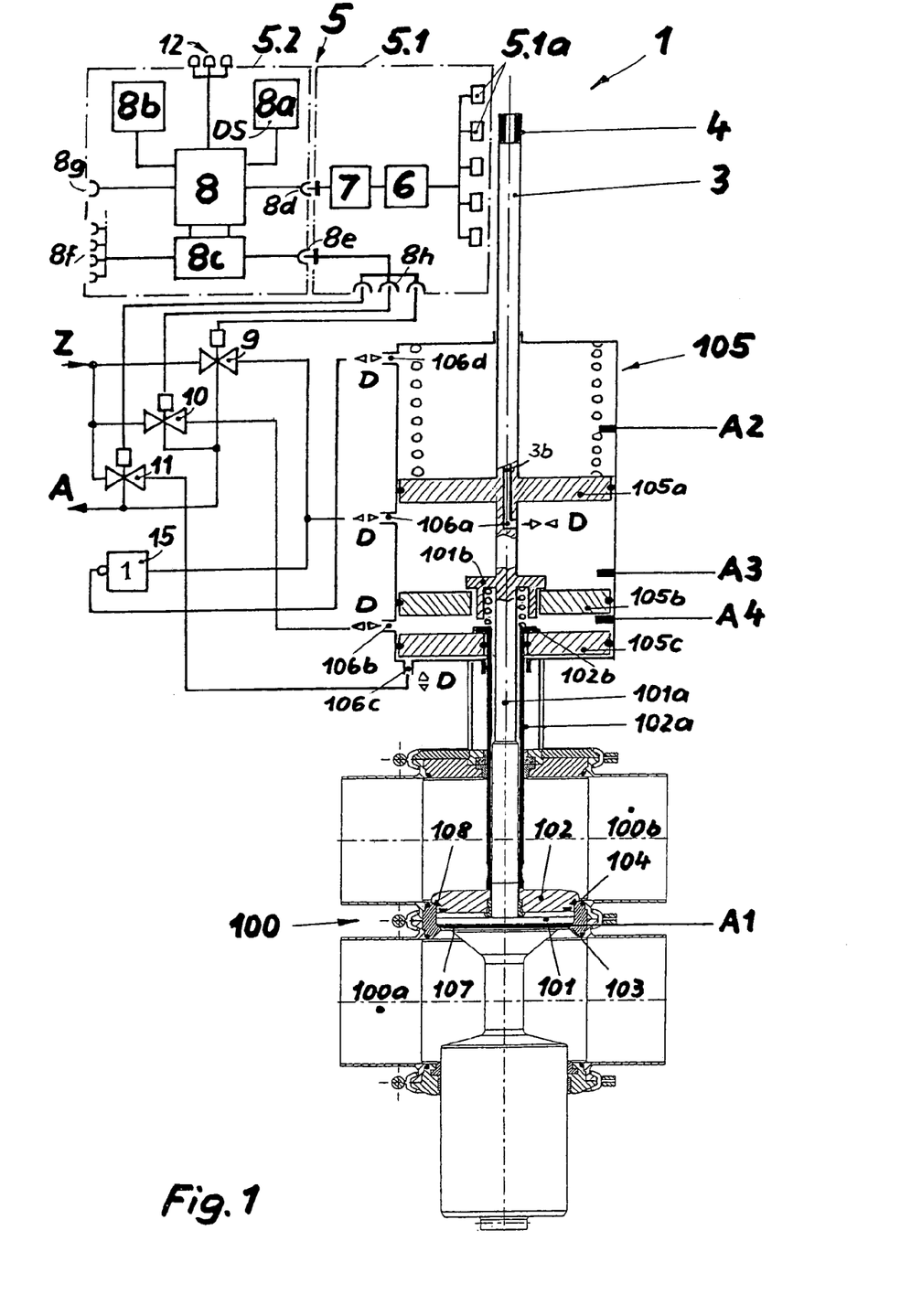
FIG. 1 shows an inventive device for the control of the switching operation of a so-called double-seated valve in a schematic representation.

Above the main piston 105a, the valve rod 101a leading to the valve disk 101 continues in a valve rod 3 which is led into a control head 1 and carries a magnet 4 at its end there. The control head 1, amongst others, comprises a position detector 5 which, in turn, is composed of a sensor unit 5.1 and a communication unit 5.2. The sensor unit 5.1 has arranged therein a number of stationary magnetic-field converters 5.1a (which preferably are magnetoresistive field converters) in a series array in parallel with and in the vicinity of the valve rod 3, the magnet 4 being displaceable, in synchronism with the valve rod 3, along the magnetic-field converters 5.1a. For example, said magnetic-field converters 5.1a are so-called Hall sensors which predetermine a bipolar output signal when the magnet 4 is approaching, running along them, and moving away from each magnetic-field converter 5.1a.

The evaluation of the magnetic field traversing the magnetic-field converters 5.1a for the purpose of detecting the position of the valve rod 3 is described in WO 96/10731, for example. The output signals of the magnetic-field converters 5.1a may be obtained in a series or in parallel. To bring power consumption down to a minimum, the magnetic-field converters 5.1a can be wired to a multiplexer 6, which allows to obtain the data in a series. They are supplied to an A/D converter 7 which is in communication with a data memory 8a via a microprocessor 8. The microprocessor 8 and data memory 8a as well as an internal control and display panel 8b, a signal adapter 8c, a terminal strip 8f, and a connection for a parametrization device 8g are located in the communication unit 5.2 which is connected to the sensor unit 5.1 via a first interface 8d and a second interface 8e. Proceeding from the signal adapter 8c, an electric supply is ensured for a connection 8h for the pilot valves 9, 10, and 11 via the second interface 8e.

The inventive control which was described hereabove with regard to its fundamental structure helps achieve a movement to each of the fixed position limiters A1 to A4 while the double-seated valve 100 effects a switching operation for the first time, and the respective fixed position messages $y_1$ to $y_4$ each resulting therefrom, as measured by the path measuring device 4, 5.1a contained in the sensor unit 5.1, are stored in the data memory 8a. These fixed position messages $y_1$ to $y_4$ are assigned each a tolerance range $\Delta T_{1i}$ to $\Delta T_{4i}$ predetermined in a predefined data record DS in the data memory 8a and the microprocessor 8 therefrom calculates the two limiting values $y_{1o}, y_{1u}$ to $y_{4o}, y_{4u}$ of the respective tolerance range $\Delta T_{1i}$ to $\Delta T_{4i}$. During the subsequent switching operations of the double-seated valve 100, the actual end positions and possibly the actual intermediate position are constantly measured for the valve rod 3 and the hollow rod 102a and the respective fixed position message $y_1^*$ to $y_4^*$ assigned thereto is resorted to and is compared to the two limiting values $y_{1o}, y_{1u}$ to $y_{4o}, y_{4u}$ of the tolerance range $\Delta T_{1i}$ to $\Delta T_{4i}$ in question. It should be noted here that the hollow rod 102a of the double disk 102 is not introduced up to the control head 1 in the embodiment of the double-seated valve 100 which is shown and, hence, to the area of the path length measuring device 4, 5.1a so that the intermediate position $y_4$ of the hollow rod 102a cannot be detected there. In the present case, this intermediate position is detected via a sensor which is not shown and is arranged between the second valve casing 100b and the valve drive 105.

Figure 2:
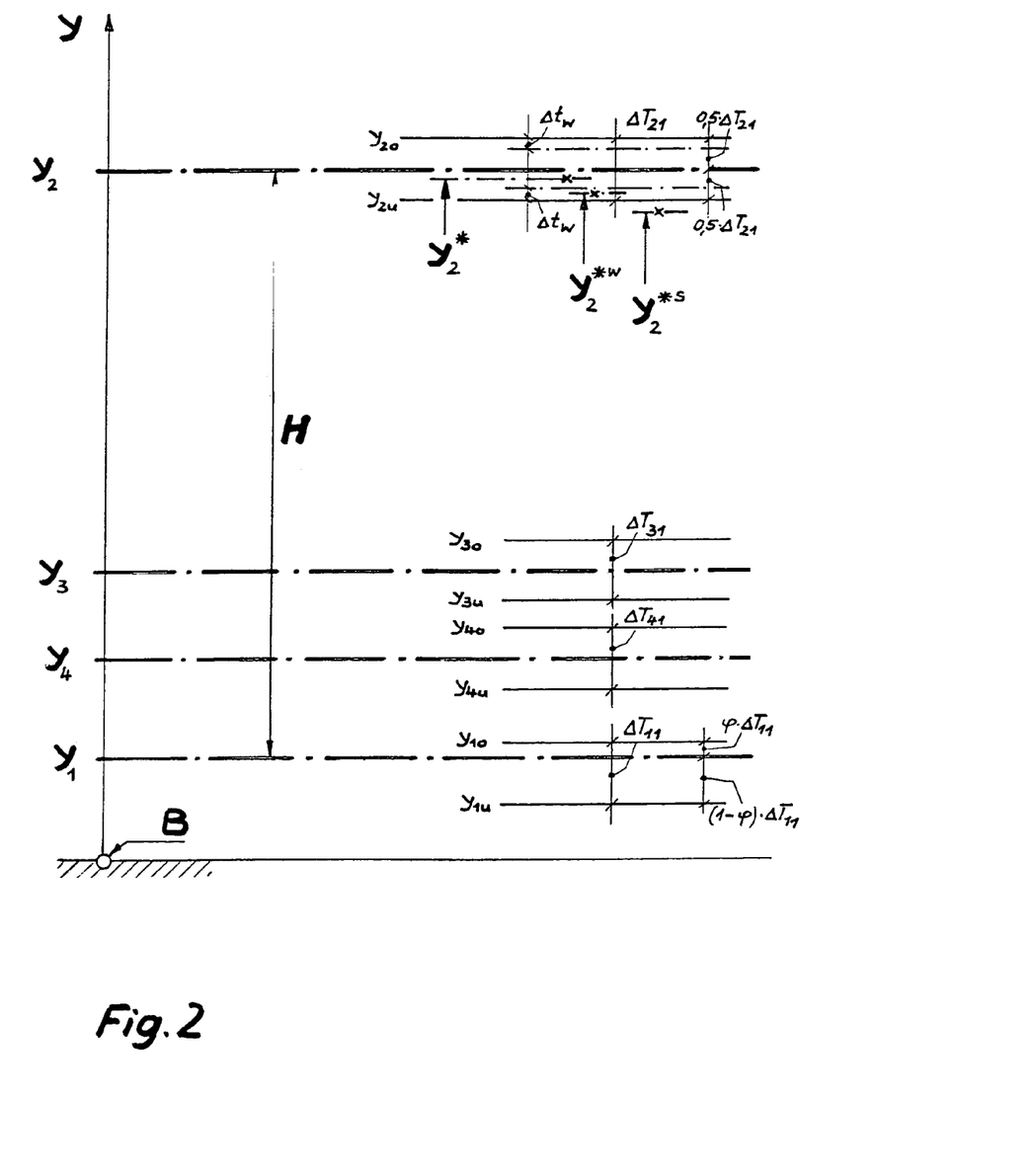
FIG. 2 shows a representation of the two end positions and the two intermediate positions of the valve rods of a double-seated valve of FIG. 1 in connection with the associated tolerance ranges and an approximation tolerance (shown by way of example for the open position $y_2$.

The fixed position messages $y_1$ to $y_4$ described hereabove which are obtained by the position messages y generally furnished by means of the path measuring device 4, 5.1a are schematically shown in FIG. 2 in connection with the predetermined tolerance ranges $\Delta T_{1i}$ to $\Delta T_{4i}$ which are assigned thereto. The example of the fixed position message $y_2$ (opened position) is utilized to show the symmetric position of the tolerance range $\Delta T_{21}$ with regard to the fixed position message $y_2$ with the quality level fixed to be i=1 here, by way of example. The fixed position message $y_1$ (the closing position) has asymmetrically associated therewith the tolerance range $\Delta T_{11}$, also with the quality level i=1, the upper limiting value resulting to be $y_{1o}=y1+\phi\Delta T_{11}$ and the lower limiting value resulting to be $y_{1u}=y_1-[1-\phi]\Delta T_{11}$, and the fraction factor can range between 0 and 1. When the tolerance range is subdivided symmetrically $\phi$ will assume the value ½ so that the upper and lower limiting values (see the fixed position message $y_2$) is equally distant from this fixed position message $y_2$.

In FIG. 2, the example of the opened position $y_2$ of the double-seated valve 100 illustrates how the inventive control monitors the end positions and, analogously, thus also monitors the intermediate positions. For example, the actual fixed position message $y_2$* is determined for the actual opened position $Y_2$ and this measured value, as based on a reference system B, is compared to the corresponding limiting values $y_{2o}$ and $y_{2u}$. As long as the measured value $Y_2$* is within the tolerance range $\Delta T_{21}$, but is outside an approximation tolerance $\Delta t_w$ placed on either side in this tolerance range, the double-seated valve 100 has reached a proper opened position. For example, this can be indicated by an optical indication signal via a lamp indicator 12 arranged on the control head 1 (see FIG. 1). When the position message $y_2$* approaches one of the two limiting values $Y_{1o}$, $y_{2u}$ within the approximation tolerance $\Delta t_w$ the control will generate a switching and/or indication signal which invites to make a maintenance, for example (maintenance messages $y_1^{*w}$ to $y_4^{*w}$). When the position message $y_2$* exits from the associated tolerance range $\Delta t_{21}$ a switching and/or indication signal will be generated (malfunction message $y_1^{*S}$ to $y_4^{*s}$) and is to be interpreted as a trouble.

Figure 5:
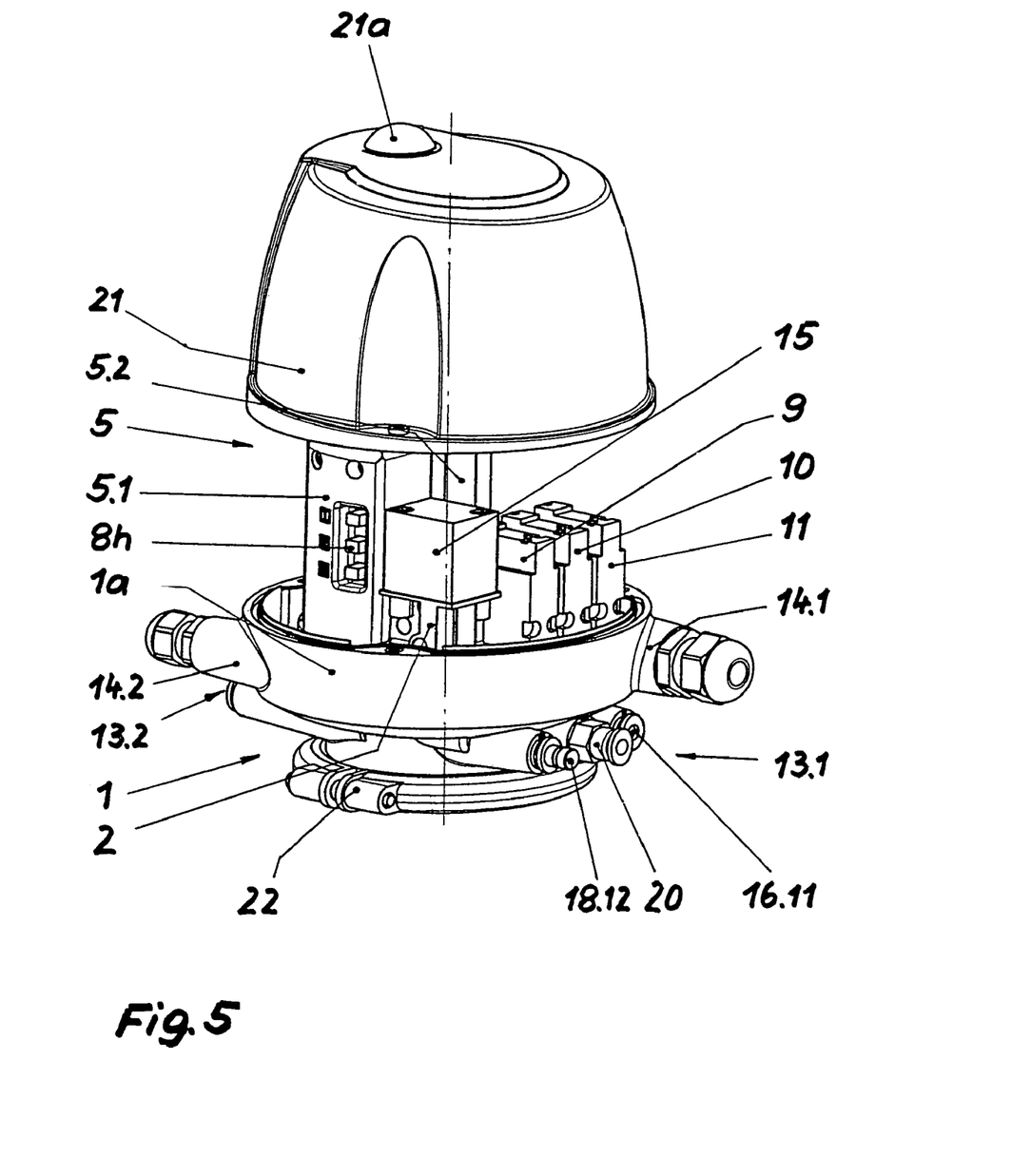
FIG. 5 shows a perspective view of the control head as seen from the side of the pilot valves with the covering hood lifted up and permitting a look at the pilot valves and position detector.

In the control head 1 which is externally formed by a casing bottom portion 1a (FIG. 3) and a covering hood 21 which closes it and is not shown (see FIG. 5), the device for the control of the switching operation of a valve, comprises an installation block 2 traversed by the valve rod 3. The latter one has arranged thereon a pot-shaped chamber casing 2a in such a way that the end of the valve rod 3, being edged on all sides and hermetically sealed towards the environment, finds its arrangement therein. Arranged at the end of the valve rod 3 is at least one magnet which preferably is of an annularly cylindrical configuration and is arranged, with its longitudinal axis, concentrically with the longitudinal axis 3a of the valve rod 3. The field of the magnet 4 propagates spatially in an axial symmetry with the longitudinal axis 3a, which orients the direction given by the two poles N, S of the magnetic dipole concentrically with the longitudinal axis 3a. The valve rod is connected to the valve disk 101 which is not shown in FIG. 3 (see FIG. 1) and varies the flow through the valve 100, and it is movable along its longitudinal axis 3a.

The pressure medium D to trigger the valve drive 105 (see FIG. 1) for the generation of the full stroke H of the valve 100 is fed through the valve rod bore 3b which is realized within the valve rod 3 and opens out at the end thereof. The pressure medium D gets into the valve rod bore 3b on its path from a supply connection 16.11 at the casing bottom portion 1a via a second supply duct system 16* in the casing bottom portion 1a, a supply duct connection point 16.12, a first supply duct portion 16a of a supply duct system 16 in the installation block 2, the first pilot valve 9 not shown in FIG. 3 (e.g. an electromagnetically operable valve; see FIG. 5), a first pressure medium duct portion 17a and, finally, via a fourth pressure medium portion 17d extending in the shell-sided wall of the chamber casing 2a and formed as a groove-shaped recess, into the interior of the chamber casing 2a. The pressure medium D, which is discharged from the valve drive 105 for the generation of the full stroke H of the valve 100, gets back into the first pressure medium duct portion 17a in an inverse path in order to be fed from thence to a discharge duct system 18 within the installation block 2 via the first pilot valve 9 and an adjoining first discharge duct portion 18a.

The installation block 2 of the control head 1 (FIGS. 4 and 5) that is connected to the casing bottom portion 1a has arranged thereon the three pilot valves 9, 10, and 11, the first pilot valve 9 triggering the full stroke H of the valve 100, the second pilot valve 10 triggering a first partial stroke (a first lifting stroke to clean the seat of the first seating surface 103 of the valve 100 if it is configured as a double-seated valve), and the third pilot valve 11 triggering a second partial stroke (a second lifting stroke to clean the seat of the second seating surface 104 of the aforementioned double-seated valve 100). Apart from the three pilot valves 9 to 11, the installation block 2 has located thereon the so-called NON element 15 the mission of which is to control the pressure medium D to apply it to the rear side of the main piston 105a. Its rearward application serves for producing an additional force which ensures an increased closing force of the valve 100. In addition, a set of pressure medium connections 13.1 are shown each of which is arranged at the casing bottom part 1a and comprises three connections, out of which the supply connection 16.11 was mentioned already in FIG. 3. The second connection is a discharge duct connection 18.12 and has ended therein the discharge duct system 18 which was mentioned already and continues within a discharge duct system which is associated therewith and is not shown, in the casing bottom portion 1a. The third connection is defined by a non-return valve connection 20. Furthermore, a first and a second connection are provided for control and signal processing lines 14.1 and 14.2, respectively (supply voltage, pilot valve signals, feedback signals, external sensors, and others). The installation block 2 is connected to pressure medium lines led to the control head 1 from outside via the first set of pressure medium connections 13.1. A connection element 22 establishes a connection between the control head 1 and the valve drive 105 located thereunder.

At its upper end, the sensor unit 5.1 has a dovetail-shaped mounting groove 5.1b (FIG. 4) which is engaged by a complementary mounting element 2b at the upper end of the chamber casing 2a for the purpose of a positive mounting. The communication unit 5.2, in turn, is attached to the sensor unit 5.1; the two of them together define the position detector 5. Provided at the upper end of the communication unit 5.2 are three indicator lamps 12 above which a stray light lens 21a is arranged which is integrated in the covering hood 21. The indicator lamps 12 are of different colours (e.g. red, green, and yellow), they can emit continuous or flashing light and their arrangement has been chosen, in an interaction with the stray light lens 21a, so that all indicator lamps 12 can be seen from all directions in the area surrounding the control head 1.

Four connections of a second set of pressure medium connections 13.2 (FIG. 4) on the side opposed to that of the control head 1 also serve for connecting pressure medium lines led to the control head 1 from outside. Via a first pressure medium duct connection 17.12, pressure medium D is supplied to the first lifting piston 105b (FIG. 1) for the generation of the first partial stroke (first lifting stroke). A second pressure medium duct connection 17.22 also feeds pressure medium D to the second lifting piston 105c for the generation of the second partial lift (second lifting stroke). As an alternative of the internal supply of the pressure medium D to the main piston 105a through a path via the valve rod 3 which is described in FIGS. 1 and 3, a third pressure medium duct connection 17.32 allows to perform this supply externally, i.e. the main piston 105a is provided with pressure medium D from outside via a flexible tubing extending from the aforementioned third pressure medium connection 17.32 (first pressure medium connection 106a). A fourth pressure medium connection 19.12, under a control via the NON element 15, routes pressure medium D onto the back side of the main piston 105a.

Figure 3:
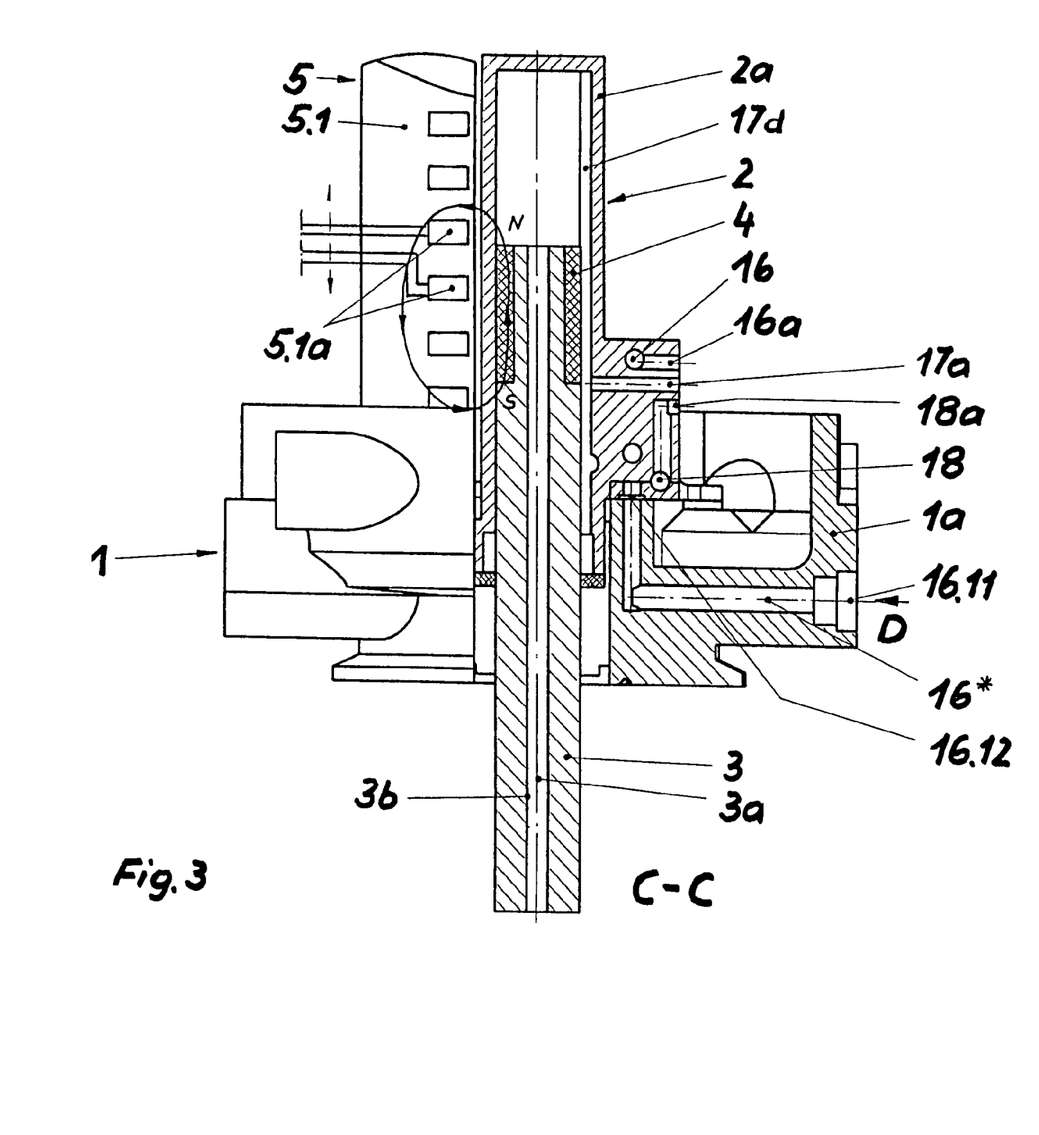
FIG. 3 shows a partial view of the (L.H. sided) control head and a (R.H. sided) longitudinal section through same in the area of the valve rod, amongst others, and the chamber casing surrounding it in accordance with a section taken along line C—C marked in FIG. 4.
Figure 4:
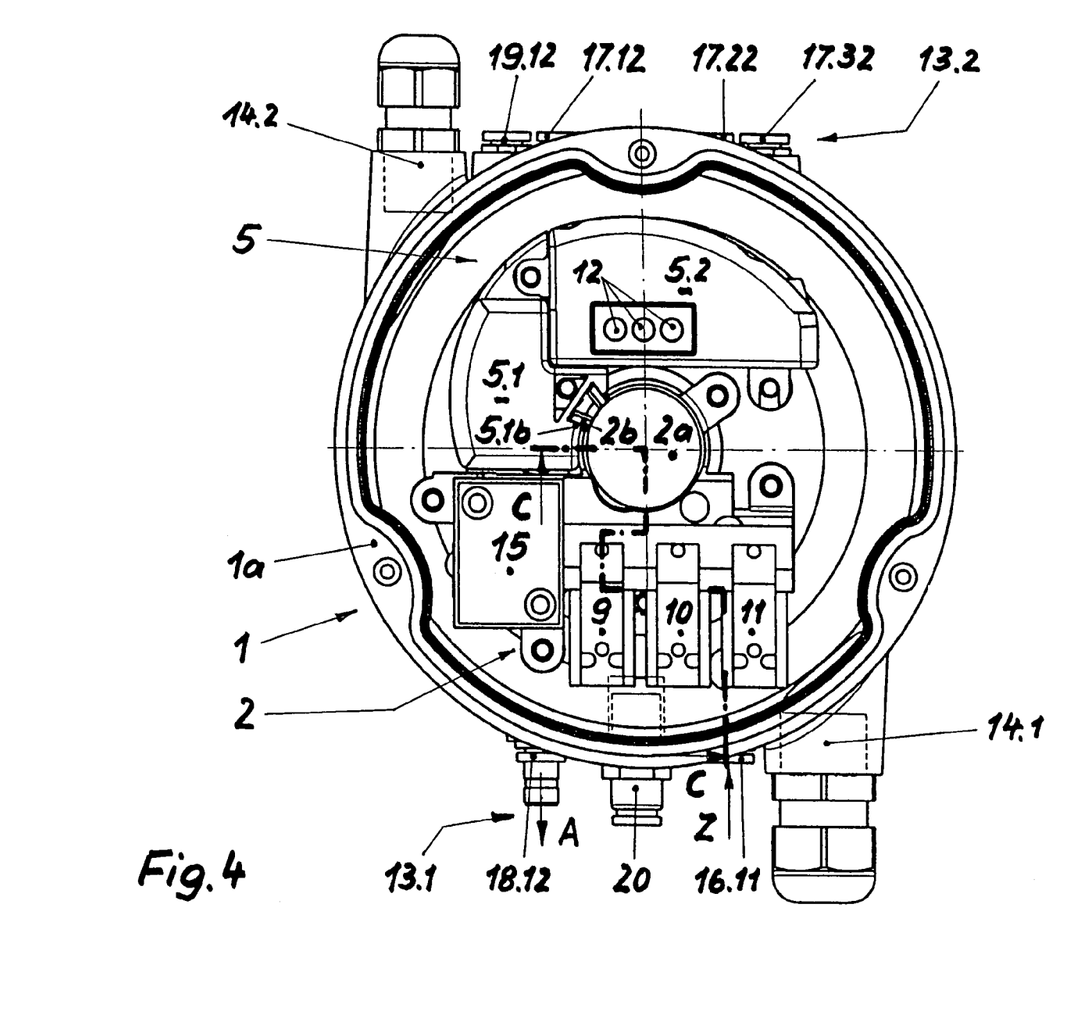
FIG. 4 shows a plan view of the control head from which its covering hood was removed.
Figure 6:
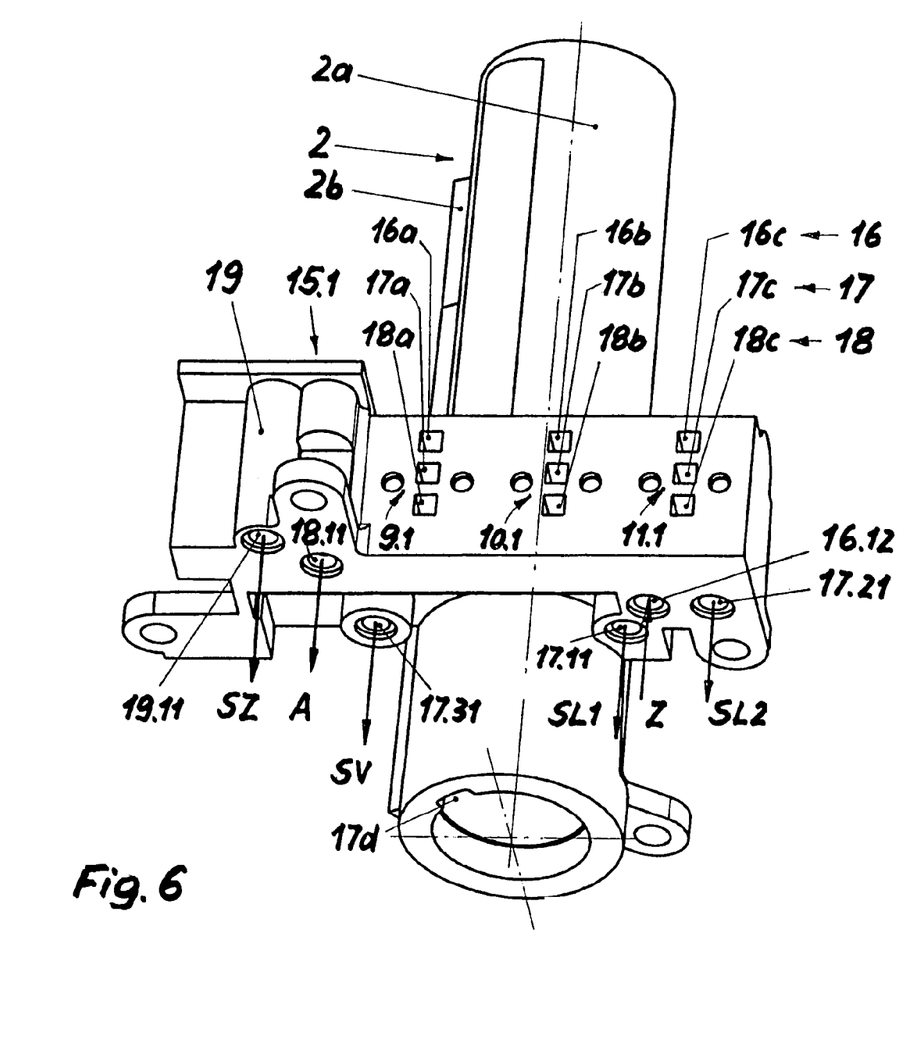
FIG. 6 shows a perspective view of the installation block as seen from the side of the connections for the pilot valve, and from the valve drive.

Appropriate connections 9.1, 10.1, and 11.1 are provided each on the installation block 2 to connect the pilot valves 9 to 11 (FIG. 6). Each of these connection points 9.1 to 11.1 has led thereto the first supply duct portion 16a and a second supply duct portion 16b and a third supply duct portion 16c, respectively, of the supply duct system (FIG. 3). From the first connection 9.1, the first pressure medium duct portion 17a of a pressure medium system, which is arranged in the casing bottom portion 1a and is not shown, leads into the interior of the chamber casing 2a (see FIG. 3) on its path via the fourth pressure medium duct portion 17d. A second pressure medium duct portion 17b extends from the second connection 10.1 into the valve drive 105 via the installation block 2 to trigger the first lifting stroke. In the same manner, a third pressure medium duct portion 17c extends from the third connection 11.1 into the associated valve drive 105 for the second lifting stroke. The first discharge duct portion 18a (also see FIG. 3) opens out into the first connection 9.1. A second and a third discharge duct portion 18b, 18c each lead to the second and third connection 10.1, 11.1. The NON element 15 is arranged on a fourth connection 15.1 (FIG. 6) on the installation block 2.

The fourth second pressure medium duct portion 17d (see FIG. 3) and, hence, the interior of the chamber casing 2a are connected to the NON element 15 via a further pressure medium duct portion which is not shown. A duct system for additional pressure medium that is arranged in the installation block 2, but is not shown, starting from the aforementioned fourth connection 15.1 of the NON element 15, provides the rear side of the main piston 105 for the full stroke H of the valve 100 with the corresponding pressure medium. The latter is fed to the NON element 15 via the supply duct system 16.

At the supply duct connection point 16.12 shown in FIG. 3 already (pressure medium supply Z), the supply duct system 16 within the installation block 2 is sealingly connected to the associated second supply duct system 16* in the casing bottom portion 1a by means of a sealing ring which is not shown (FIG. 6). In the same manner, a first pressure medium duct system 17 in the installation duct 2 is sealingly connected to the associated pressure medium duct system (not shown) in the casing bottom portion via a first pressure medium connection point 17.11 (pressure medium for the first lifting stroke SL1) or a second pressure medium connection point 17.21 (pressure medium for the second lifting stroke SL2) or a third pressure medium connection point 17.31 (to externally trigger the valve drive 105 for the full stroke H by means of the pressure medium SV). Accordingly, the discharge duct system 18, and a second pressure medium duct system 19, which is not shown, for additional pressure medium also are sealingly connected each, via a discharge duct connection point 18.11 (pressure medium discharge A), to the corresponding systems in the casing bottom portion 1a via a fourth pressure medium connection point 19.11 (pressure medium for additional load SZ).

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for the control of the switching operation of a valve which has two valve rods which are translationally moved and each carries a closing member, both closing members being designed to block a connection passage between two fluid lines or containers wherein the valve rod(s), by means of a drive to which a pressure medium is applied, is/are moved to two end positions resulting in a full stroke (H) wherein at least one valve rod is moved, to an intermediate position located between said end positions and forming a partially opened position of the associated closing member, wherein the actual position of at least one of the valve rods illustrating the movement of the valve rod is continuously detected via a position detector in relation to a reference system and the relevant position messages (y) are continuously stored, and a comparison is provided between this actually gained data and that which were stored prior to the first switching operation of the valve characterized further in that the two end positions and the intermediate position are clearly determined by the valve rod or closing members bearing on first, second, third and fourth metallic fixed position limiters, said third and fourth position limiters being at intermediate positions between said first and second position limiters, that in the course of the first switching operations of the valve the respective resultant fixed position messages ($y_1$, $y_2$, $y_3$, $y_4$,) from the position detector on locations of first, second, third and fourth metallic fixed position limiters are stored, that the fixed position messages ($y_1$, $y_2$ . . . ) have associated therewith a predetermined tolerance range each ($\Delta T_{1i}$, $\Delta T_{2i}$, $\Delta T_{3i}$, $\Delta T_{4i}$) and the two limiting values ($y_{1o}$, $y_{1u}$; $y_{2o}$, $Y_{2u}$; $Y_{3o}$, $y_{3u}$; $y_{4o}$, $y_{4u}$) of the respective tolerance range ($\Delta T_{1i}$, $\Delta T_{2i}$, . . . ) are calculated therefrom, that an actual fixed position message ($y_1^*, y_2^*, y_3^*, y_4^*$) associated with each of the actual end positions the actual intermediate position are resorted to during the subsequent switching operations of the valve and are compared to the two limiting values ($y_{1o}, y_{1u}; y_{2o}, y_{2u}; \ldots$) of the tolerance range concerned ($\Delta T_{1i}, \Delta T_{2i}, \ldots$), and that a switching signal message signal is generated when the actual fixed position messages values ($y_1^*, y_2^*, y_3^*, y_4^*$) approach the associated limiting values ($Y_{1o}, y_{1u}; y_{2o}, y_{2u}; \ldots$) or when the associated tolerance range ($\Delta T_{1i}, \Delta T_{2i}, \ldots$) is exited.

2. The method according to claim 1, characterized in that the data stored before the first switching operation of the valve are withdrawn from a record (DS) deposited in the control which identifies and monitors the respective configuration of the valve, its switching motions, and its switching algorithm.

3. The method according to claim 2, characterized in that tolerance ranges ($\Delta T_{1i}, \Delta T_{2i}, \Delta T_{3i}, \Delta T_{4i}$)) of different quality levels (i=1, 2, 3, ...) are contained in the data record (D) wherein each quality level (i) comprises a tolerance range set ($\Delta T_{11}, \Delta T_{21}, (\Delta T_{31}, \Delta T_{41}; \Delta T_{12}, \Delta T_{22}, (\Delta T_{32}, \Delta T_{42}; \Delta T_{13}, \Delta T_{23}, \ldots \Delta T_{14}, \Delta T_{24}; \ldots$).

4. The method according to claim 3, characterized in that the fixed position messages ($y_1, y_2, y_3, y_4$) have associated therewith a tolerance range set.

5. The method according to claim 3, characterized in that the fixed position messages ($y_1, y_2, y_3, y_4$), respectively, have associated therewith tolerance ranges of different quality levels (i).

6. The method according to claim 1, characterized in that the tolerance range ($\Delta T_{1i}, \Delta T_{2i}, \Delta T_{3i}, \Delta T_{4i}$) is arranged in asymmetry with and in favour of a most likely alteration of the associated fixed position message ($y_1, y_2, y_3, y_4$) to the latter ($y_{1o}=y_1+\phi\Delta T_{1i}, y_{1u}=y_{1-}[1-\phi]\Delta T_{1i}$ with a fraction factor $\phi$ where $0 \leq \phi \leq 1; \ldots$).

7. The method according to claim 1, characterized in that the tolerance range ($\Delta T_{1i}, \Delta T_{2i}, \Delta T_{3i}, \Delta T_{4i}$) is arranged in symmetry with the associated fixed position message ($y_1, y_2, y_3, y_4$)($y_{1o}=y_1+\Delta T_{1i}/2; y_{1u}=y_1-\Delta T_{1i}/2; \ldots$, where $\phi$ is 0.5).

8. The method according to claim 1, characterized in that when an approximation of the actual fixed position messages ($y_2^*, Y_2^*, y_3^* y_4^*$) to the associated limiting values ($Y_{1o}, y_{1u}, y_{2o}, y_{2u}; \ldots$) of the tolerance range ($\Delta T_{1i}, \Delta T_{2i}, \Delta T_{3i}, \Delta T_{4i}$) is effected a maintenance signal is generated where said approximation is defined by an approximation tolerance $\Delta_{tw}$ each which joins the respective limiting values (($y_{1o}, y_{1u}, y_{2o}, y_{2u}; \ldots$).

9. A device for the implementation of the method according to claim 1, comprising
a valve having two valve rods which are translationally moved and each carries a closing member, both closing members being designed to block a connection passage between two fluid lines of containers,
a valve drive, to which a pressure medium is applied, for the valve rod(s),
mechanism for controlling the pressure medium for the valve drive,
a position detector which is associated with the valve rods and continuously detects the actual position of the valve rod that illustrates the valve rod movements in relation to a fixed reference system and provides relevant actual position messages (y),
mechanism for the continuous storage of said actual position messages (y), and
mechanism for the calculation and comparison between data from data predetermined prior to the first switching operation of the valve and/or in the course of the valve operations, characterized further in
that two end positions ($y_1, y_2$) of the valve rods which result in a full stroke (H) are clearly determined by the valve rods or closing members bearing on first and second metallic fixed position limiters,
that an intermediate position ($y_3, y_4$) each of the valve rod between the end positions ($y_1, y_2$) are clearly determined by the valve rod(s) bearing directly or indirectly on third and fourth metallic fixed position limiters to define a partially opened position of the respective closing member,
that the position detector is formed as a non-contacting position indicator which operates in a non-contacting way and which, in a sensor unit, has a number of stationary magnetic-field converters in a series array in parallel with and in the vicinity of a valve rod movement to be detected, and a magnet which is connected to the valve rod is displaceable along the magnetic-field converters
and that all of the mechanisms required for the control of the valve are arranged in a control head which is provided on the side of the valve drive which faces away from the valve.

10. The device according to claim 9, characterized in that the position detector (5), in a sensor unit (5.1), has a number of stationary magnetic-field converters (5.1a) which are arranged in a series array in parallel with and in the vicinity of a valve rod movement to be detected, and that a magnet (4) which is connected to the valve rod (3) is displaceable along the magnetic-field converters (5.1a).

11. The device according to claim 9, characterized in that the first, second, third and fourth metallic fixed position limiters are formed as metallic stops in said valve.

12. The device according to claim 9, characterized in that the control head has provided therein an installation block including pilot valves, said installation block receives the entire distribution system for the pressure medium in itself and carries pilot valves for the control of the pressure medium and the position detector comprising the sensor unit and a communication unit.

13. The device according to claim 11, further includin gan installtion block, characterized in that the installation block is designed for the highest completion stage of the control of a valve (the control of the two end positions and the intermediate positions each of the valve disk and double disk) and that completion is performed in a modular way.

14. A device for the implementation of the method according to claim 1, comprising
a valve having at least one valve rod which is translationally moved and carries a closing member,
a valve drive, to which a pressure medium is applied, for the valve rod(s),
mechanism for controlling the pressure medium for the valve drive,
a position detector which is connected to the valve rod and continuously detects the actual position of the valve rod that illustrates the valve rod movement in relation to a fixed reference system and provides relevant actual position messages (y),
mechanism for the continuous storage of said actual position messages (y), and
mechanism for the calculation and comparison between data from data predetermined prior to the first switching operation of the valve and/or in the course of the valve operations, characterized in
that two end positions ($y_1$, $y_2$) of the valve rod which result in a full stroke (H) are clearly determined by the valve rod bearing directly or indirectly on first and second metallic fixed position limiters,
that an intermediate position ($y_3$, $y_4$) each of the valve rods between the end positions ($y_1$, $y_2$) are clearly determined by the valve rod(s) bearing directly or indirectly on third and fourth metallic fixed position limiters to define a partially opened position of the respective closing member,
that the position detector is formed as a non-contacting position indicator which operates in a non-contacting way and which, in a sensor unit, has a number of stationary magnetic-field converters in a series array in parallel with and in the vicinity of a valve rod movement to be detected, and a magnet which is connected to the valve rod is displaceable along the magnetic-field converters and that all of the mechanisms means for the control of the valve are arranged in a control head which is provided on the side of the valve drive which faces away from the valve characterized in that the pressure medium which triggers the valve drive for the generation of the full stroke (H) is fed via a valve rod bore in the valve rod.

15. The device according to claim 9, characterized in that the pressure medium for triggering the valve drive for the generation of the full stroke (H) is fed to the valve drive from outside via a first pressure medium connection.

16. The device according to claim 9, characterized in that the valve drive has a fourth pressure medium connection via which, when the valve is in the closed position, the closing force onto the valve rod is increased by a supply of pressure medium.

17. A device for the implementation of the method according to claim 1, comprising
a valve having at least one valve rod which is translationally moved and carries a closing member,
a valve drive, to which a pressure medium is applied, for the valve rod(s),
mechanism for controlling the pressure medium for the valve drive,
a position detector which is connected to the valve rod and continuously detects the actual position of the valve rod that illustrates the valve rod movement in relation to a fixed reference system and provides relevant actual position messages (y),
mechanism for the continuous storage of said actual position messages (y), and
mechanism for the calculation and comparison between data from data predetermined prior to the first switching operation of the valve and/or in the course of the valve operations,
characterized in
that two end positions ($y_1$, $y_2$) of the valve rod which result in a full stroke (H) are clearly determined by the valve rod bearing directly or indirectly on first and second fixed position limiters,
that an intermediate position ($y_3$, $y_4$) each of the valve rod between the end positions ($y_1$, $y_2$) are clearly determined by the valve rod(s) bearing directly or indirectly on third and fourth fixed position limiters to define a partially opened position of the respective closing member,
that the position detector is formed as a non-contacting position indicator which operates in a non-contacting way and which, in a sensor unit, has a number of stationary magnetic-field converters in a series array in parallel with and in the vicinity of a valve rod movement to be detected, and a magnet which is connected to the valve rod is displaceable along the magnetic-field converters
and that all of the mechanisms required for the control of the valve are arranged in a control head which is provided on the side of the valve drive which faces away from the valve, characterized in that the position detector is equipped with more than one indicator lamp of different colorations, the indicator lamp being visible all around (through 360°) via a stray light lens which is disposed in the closed front-end face of a covering hood locking the control head.

* * * * *